United States Patent [19]

Sturdy

[11] Patent Number: 4,640,246
[45] Date of Patent: Feb. 3, 1987

[54] ROAD AND ENGINE SPEED GOVERNOR WITH POWER DEMAND CONTROL

[75] Inventor: H. David Sturdy, Wilmington, N.C.

[73] Assignee: Sturdy Truck Equipment, Incorporated, Wilmington, N.C.

[21] Appl. No.: 815,966

[22] Filed: Jan. 3, 1986

[51] Int. Cl.⁴ .................... F02D 41/00; F02D 43/00
[52] U.S. Cl. .................................. 123/350; 123/361
[58] Field of Search ............. 123/350, 361, 352, 376, 123/349, 340, 339; 180/178

[56] References Cited

U.S. PATENT DOCUMENTS

| | | | |
|---|---|---|---|
| 3,700,996 | 10/1972 | Gutting | 123/361 |
| 4,090,480 | 5/1978 | Kasiowicz | 123/361 |
| 4,161,994 | 7/1979 | Collonia | 123/361 |
| 4,192,398 | 3/1980 | Hunt | 123/361 |
| 4,212,272 | 7/1980 | Hawk | 123/361 |
| 4,475,503 | 10/1984 | Nakamura et al. | 123/361 |
| 4,519,361 | 5/1985 | Murakami | 123/361 |
| 4,523,564 | 6/1985 | Sturdy | 123/361 |
| 4,539,955 | 9/1985 | Wilson et al. | 123/350 |
| 4,559,913 | 12/1985 | Kido | 123/350 |
| 4,592,322 | 6/1986 | Murakami et al. | 123/361 |

Primary Examiner—Raymond A. Nelli
Attorney, Agent, or Firm—Reising, Ethington, Barnard, Perry & Milton

[57] ABSTRACT

A governor is disclosed for governing engine and road speed for motor vehicles. A movable overriding throttle closing device limits the speed to governed values. An actuator for the device is moved by a reversible motor to a reference position when a speed call-in value is reached and the actuator is moved at slow speed to maintain the governed speed. The actuator is moved to an intermediate position closely adjacent to the reference position for speeds below the call-in value. An engine power demand control system is provided to cause the actuator to be moved in the wide open throttle direction in response to a sustained power demand.

2 Claims, 4 Drawing Figures

ROAD AND ENGINE SPEED GOVERNOR WITH POWER DEMAND CONTROL

FIELD OF THE INVENTION

This invention relates to engine and load speed governors; more particularly, it relates to governors with an overriding throttle closing means for limiting the flow of fuel to the engine.

BACKGROUND OF THE INVENTION

This invention is an improvement in the governor set forth in my U.S. Pat. No. 4,523,564 granted June 18, 1985 entitled "ROAD AND ENGINE SPEED GOVERNOR". The entire disclosure of that patent is incorporated herein by reference.

SUMMARY OF THE INVENTION

In accordance with this invention, a throttle limiting actuator is positioned to obtain optimum smooth governing under all conditions yet it moves toward wide open throttle in response to power demand so that the driver can always utilize engine power as needed. This is accomplished by sensing engine power demand and controlling the actuator motor in response to a sustained demand signal. Further, smooth governing with fast response is enhanced under all conditions by providing an additional positioning point for the actuator in close proximity to the reference position.

A more complete understanding of this invention may be obtained from the detailed description that follows taken with the accompanying drawings.

BEST MODE FOR CARRYING OUT THE INVENTION

Figure 1:
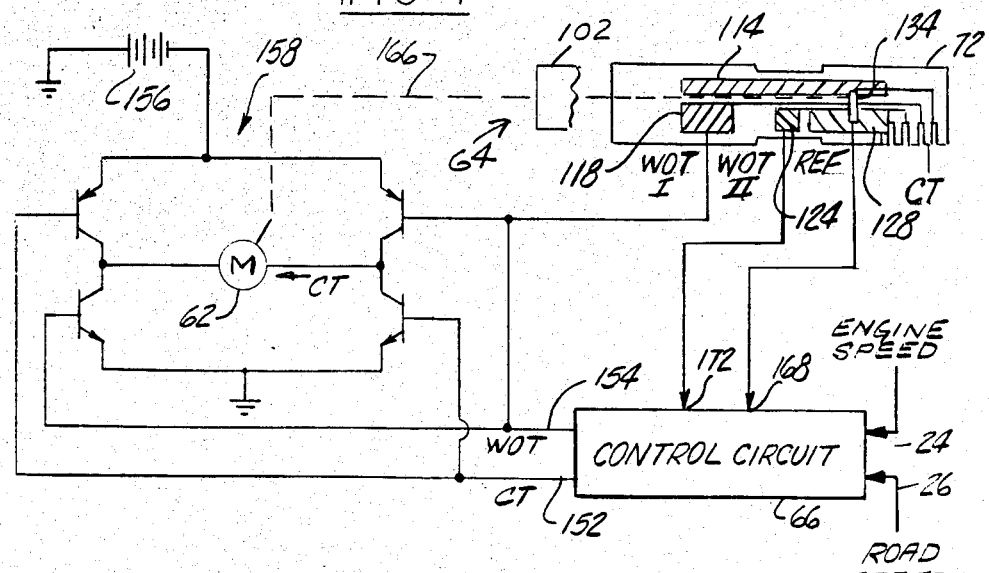
FIG. 1 is a block diagram showing the power demand control system of this invention.

Referring now to the drawings, there is shown an illustrative embodiment of the invention utilizing a switch plate with multiple positioning points and a power demand control system. It will be appreciated as the description proceeds that the invention may be utilized in different embodiments and utilized in various governor applications.

The governor is shown diagrammatically in FIG. 1. It comprises, in general, a reversible electric motor 62 which is drivingly connected with a linear actuator 64 which, by suitable connection, limits the throttle opening position in accordance with governor operation. The governor also includes an electrical control circuit 66 which comprises a microprocessor. The microprocessor operates under program control and includes a read-only memory which stores the operating program of the microprocessor. The governor includes a switch plate 72 which coacts with the linear actuator 64 and is electrically connected with the control circuit 66. The actuator 64 comprises an actuator member 102 which is mounted on a lead screw so that motor rotation causes the actuator member to advance or retract in accordance with direction of rotation. The actuator member 102 carries a bridging contact 134 which coacts with the switch plate 72.

The electronic control circuit 66 receives an engine speed signal at input port 24 and the road speed signal at input port 26. In response to the speed signals and other inputs, the electronic control circuit 66 develops motor control signals for controlling the reversible motor 62. A close throttle motor control signal CT is developed at output port 152 and an open throttle control signal WOT is developed at output port 154. The motor 62 is energized from the vehicle battery 156 through a motor driver circuit 158. The close throttle control signal CT and the open throttle control signal WOT are applied to the driver circuit 158. The bridging contact 134 (mounted on the actuator member 102) is shown in FIG. 1 as being connected with the motor 62 through a mechanical drive coupling 166. The actuator member 102 is connected through a cable 30 to the throttle arm to limit the throttle opening position of the engine throttle.

The switch plate 72 comprises a printed circuit board with a set of conductive paths adjacent the path of the bridging contact 134. The switch plate comprises an elongated ground contact 114 having a terminal 116. It also comprises a wide open throttle contact, herein called a WOT I contact pad 118 having a terminal 122. The switch plate also includes an intermediate contact pad 124, herein called a WOT II contact, having a terminal 126. The switch plate also includes a reference contact pad 128 having a terminal 132. The bridging contact 134 is adapted to bridge between the ground contact 114 and the WOT I pad 118, the WOT II pad 124 and the reference pad 128 as the actuator member is moved axially by the lead screw. When the bridging contact 134 engages the reference pad 128, a reference position signal is supplied to an input port 168 on the control circuit 66. Similarly, when the bridging contact 134 engages the WOT II pad 124, a WOT II position signal is supplied to an input port 172 on the control circuit 66. When the bridging contact 134 engages the WOT I pad 118, a WOT I position signal is applied to the control circuit 66 by grounding the output port 154.

Figure 2:
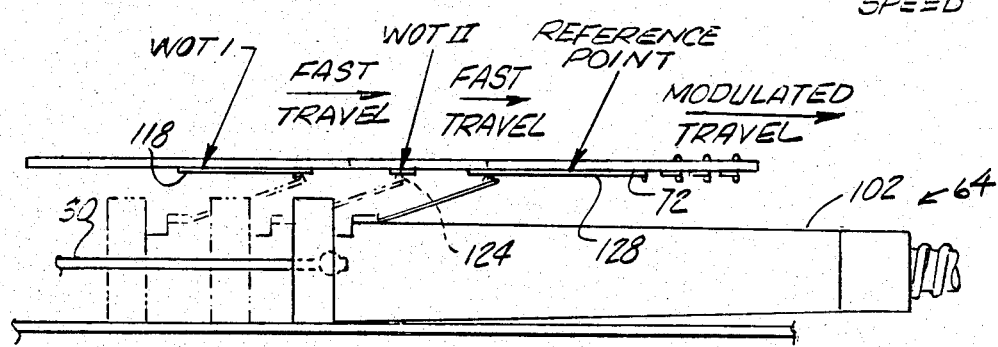
FIG. 2 is a diagram illustrating the actuator and switch plate.
Figure 3:
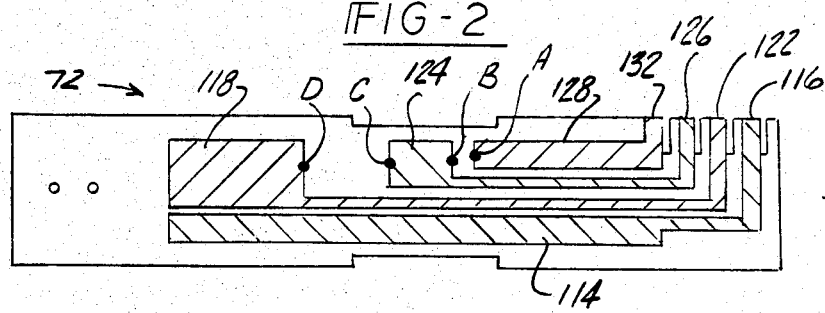
FIG. 3 shows details of the switch plate.

The actuator member 102 is movable by the motor 62 over a range of movement extending between the CT (close throttle) position and the WOT I (wide open throttle) position. The actuator member 102 and the switch plate 72 are shown in FIG. 2 with the actuator member in alternate positions. In FIG. 3, four positioning points of the contact 134 by actuator 64 are shown as positions A, B, C and D. With the actuator member 102 in position D, the bridging contact 134 engages the WOT I contact 118 and the accelerator pedal is allowed to actuate the throttle plate to full wide open throttle. The actuator member 102 is moved to this position for starting the engine, dechoking the carburetor and under certain vehicle operating conditions in which full engine power should be allowed. (This position is used as the engine start position for a carburetor engine but it is not required for starting a fuel injected engine.) The actuator member 102 is moved between the position D and position C by high speed motor operation. Position D is at the upper edge of the WOT I pad. Position C is at the lower edge of the WOT II pad and position B is at the upper edge of the WOT II pad. Position A is at the lower edge of the reference pad. Movement from position D to position B upon engine start up with the transmission in neutral for operation of the governor in the neutral mode will be described subsequently. Movement of the actuator from position B to position C takes place when the engine is running with the transmission in gear and the clutch engaged. The actuator member 102 is moved by high speed motor operation to position A at the reference pad from any of the other positions when a call-in speed is reached. When the actuator member 102 has reached position A, a reference position signal is applied to the control circuit 66 which is conditioned in response to the signal for producing motor control signals which are modulated to provide low speed motor operation in either the close throttle or the open throttle direction, depending upon whether the speed is above or below the governed value. When the governor is operating in either the neutral mode after the reference position has been reached, the motor will be operated at high speed to the C position if the engine speed falls below a drop out value, say 450 RPM lower than the governed value. Similarly, when the governor is operating in the road speed governing mode, after the reference position has been reached, the control motor will be operated at high speed to the D position if the road speed falls below the drop out value, say 4 MPH below the governed value.

Figure 4:
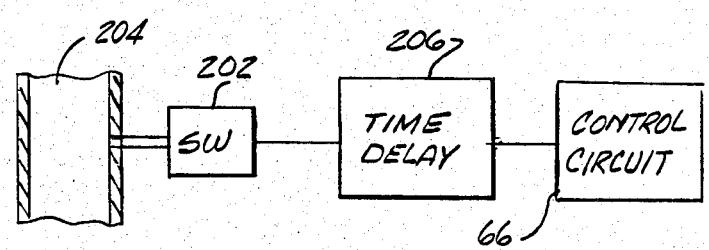
FIG. 4 is a block diagram of the power demand control circuit.

In order to ensure that engine power may be applied as needed to maintain desired or governed speed, a power demand control system is utilized as shown in FIG. 4. In the illustrative embodiment of the governor for a gasoline engine, the intake manifold vacuum is utilized as an indicator of power demand on the engine. (In other embodiments, as for example a diesel engine, power demand may be sensed by throttle position or other conditions.) As shown in FIG. 4, the power demand system comprises a power demand sensor in the form of a vacuum switch 202 which is coupled to the intake manifold 204 and responsive to the vacuum therein. The vacuum switch 202 is normally open at high vacuum and is adapted to close at a predetermined lower value of vacuum indicative of a predetermined degree of power demand. The vacuum switch 202 is electrically connected to the input of a time delay circuit 206. The output of the time delay circuit is normally at logic low; when an input signal is applied to the time delay circuit from the vacuum switch the time delay circuit begins to time out and after a predetermined time interval, say 2 seconds, the output is switched to a logic high which is applied to the control circuit 66. The time delay period is selected to assure that the power demand is a sustained demand (not merely a brief transient) which justifies movement of the actuator toward wide open throttle. When the power demand signal is applied to the control circuit 66 the control circuit causes the motor 62 to be energized in the wide open throttle direction. It will continue to be energized to move the actuator toward point D unless the manifold vacuum increases above the predetermined value or unless the acceleration is higher than a predetermined value or the speed reaches the governed speed. Upon occurrence of any such event, the control circuit energizes the motor to move the actuator at fast speed to the position B for neutral governing or to position C for road speed governing.

The operation of the system is as follows. When the ignition is turned on, the control circuit 66 causes the motor 62 to be energized to move the actuator to the position D. When the engine is started, as verified by engine speed above 250 RPM, the control circuit causes the actuator to move to position B. When the governed value is reached, the actuator moves to position A on the reference pad 128. It will remain on the reference pad until the engine speed drops below a predetermined drop out speed. In that case, the actuator returns to position B and it moves back to position A when the governed value is again reached. If the ignition is turned off, the actuator remains in place. When the ignition is turned on again the actuator is moved to the engine start position D as previously described. This completes a typical example of governing in the neutral governing mode. In the neutral mode, the actuator is positioned at position B, the upper edge of the WOT II pad 124 which is close to the reference pad 128 and it is therefore able to reach position A quickly when the governed value of engine speed is reached or in the event of an acceleration call-in signal. The actuator moves to the reference point A and beyond it toward close throttle as needed to control the engine speed. The actuator remains at the reference pad position until the engine speed falls below the drop out value. Then the actuator is repositioned at position B ready to repeat the control governing sequence or to change over to the road speed (in-gear) governing mode. In addition to the quick response capability in neutral mode governing just described, the system prevents RPM overshoot in neutral once the actuator has reached the reference position A. For this purpose, the switch plate 72 is set so that the speed can exceed the governed value by only a small amount. For example, if the governed speed is 3600 RPM the switch plate may be set to allow only approximately 100 RPM above that. After the actuator has moved to position A it is prevented from moving toward wide open throttle until the engine speed drops below the preset drop out value. This ensures that the driver cannot cause excessive overshoot in neutral.

Operation of the governor in the road speed governing mode (in-gear mode) is as follows. With the engine at idle speed and the transmission in neutral, the actuator is at position B. When the transmission is in gear and the clutch engaged, as detected by a suitable in-gear detector, the actuator is moved to point C. From this position, the actuator is moved to position A in response to the predetermined call-in speed. In this mode, the movement of the actuator in the wide open throttle direction is limited to position C unless there is a power demand signal. If there is a power demand requiring more throttle, as in the event of encountering an upgrade, the manifold vacuum will drop to a predetermined value for a sustained period and the power demand signal at the control circuit 66 will cause the actuator to move toward point D. This will continue, so long as the power demand signal persists, until point D is reached or until the acceleration exceeds a certain value or the governed value is reached. Upon occurrence of either event, the actuator is returned to position C. The road speed governing mode continues with the actuator at position C as previously described.

There is no requirement in either the neutral governing mode or the road speed governing mode (in-gear) for the actuator to reach a given position before it can respond to a fast acceleration call-in or a normal call-in toward closed throttle. The system is free to respond to any engine speed or road speed command signal without completing the task currently being executed.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A speed limiting governor for use with an engine having a throttle movable between an open throttle position and a close throttle position for regulating the flow of fuel to the engine, said governor being of the type comprising an overriding throttle closing means, an engine speed signal generating means for producing a signal corresponding to engine speed, a load speed signal generating means for producing a signal corresponding to load speed, actuating means including a reversible motor coupled with the overriding throttle closing means and being responsive to motor control signals for energizing the motor in the close throttle direction or in the open throttle direction, logic means responsive to the engine speed signal and the load speed signal for producing motor control signals for moving the overriding means between a wide open throttle position and a close throttle position and to intermediate positions including a reference position, said logic means being responsive to said speed signals for moving said overriding means in the close throttle direction to said reference position when the engine speed reaches a first preset value, and means responsive to engine power demand for energizing said motor to move said overriding means from said reference position toward said open throttle position.

2. The invention as defined in claim 1 including means for moving said overriding means to a first intermediate position when the governor is operated in an in-gear mode and means for moving said overriding means to a second intermediate position between the first intermediate position and said reference position when said governor is operated in a neutral mode.

* * * * *